H. R. HOLBROOK.
TIRE CASING.
APPLICATION FILED APR. 17, 1909.
983,231.
Patented Jan. 31, 1911.
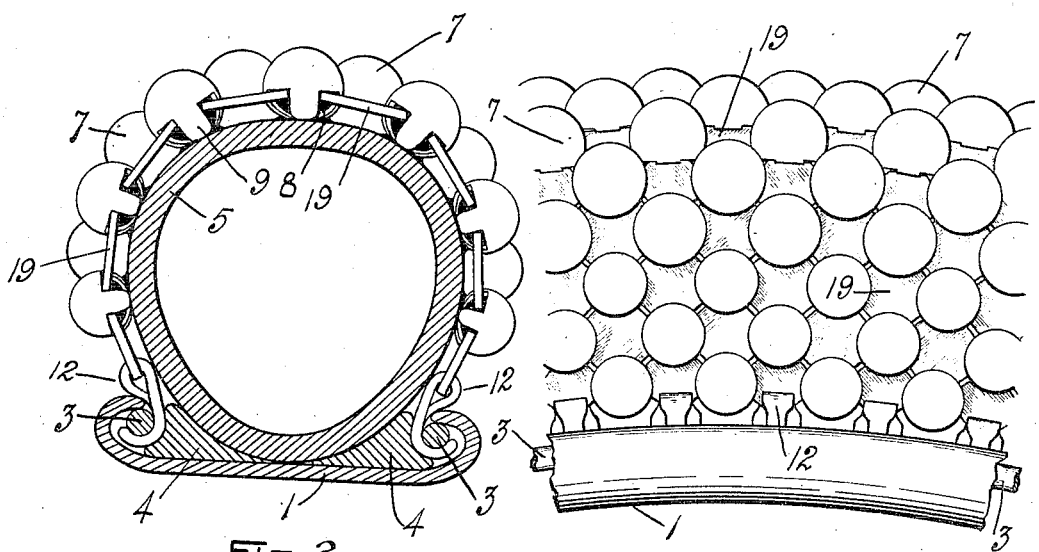
FIG. 3.  FIG. 4.
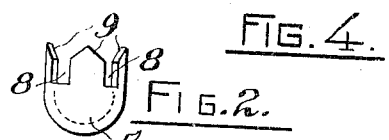
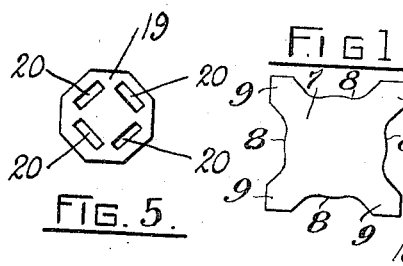
FIG. 5.
FIG. 6.
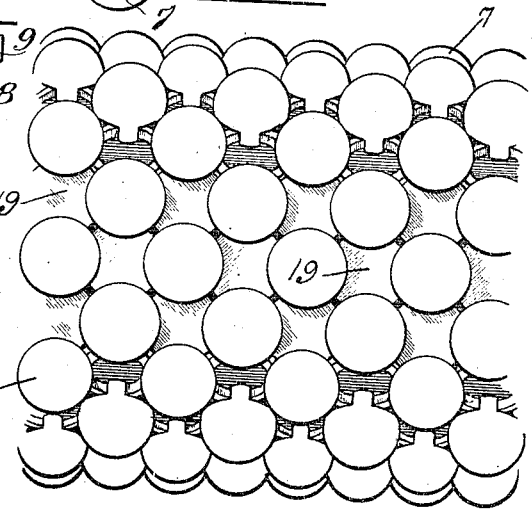
FIG. 7.
WITNESSES.
Albert G. Piegenthowski
George H. McLaughlin
INVENTOR.
Harry R. Holbrook
By Horatio E. Bellows
ATTORNEY.

UNITED STATES PATENT OFFICE.

HARRY R. HOLBROOK, OF ATTLEBORO, MASSACHUSETTS.

TIRE-CASING.

983,231.  Specification of Letters Patent.  Patented Jan. 31, 1911.

Application filed April 17, 1909. Serial No. 490,569.

*To all whom it may concern:*

Be it known that I, HARRY R. HOLBROOK, a citizen of the United States, residing at Attleboro, in the county of Bristol and State of Massachusetts, have invented certain new and useful Improvements in Tire-Casings, of which the following is a specification.

My invention relates to metallic casings or guards for tires of automobiles, bicycles, and other vehicles.

Its essential objects are to prevent puncture, abrasion or other injury to the tire, to prevent slipping and to attain these ends in a structure which is simple, strong, and inexpensive to manufacture.

A further object is to provide a novel attaching or securing means for the margin of the casing.

Other objects will be hereinafter disclosed in the description and be made the subject of claims.

In the drawings which accompany this specification and form a part thereof, Figure 1 is a plan of the blank from which a clenching member is formed, Fig. 2, a side elevation of the same cupped up, Fig. 3 is a transverse section, partially in side elevation, of a rubber tire, its mounting parts, and my novel casing applied thereto. Fig. 4 is a side elevation of the same. Fig. 5, a detail view of a connecting plate. Fig. 6, a bottom plan view of the plate engaged by four balls, and Fig. 7, a top plan view of the modified form of casing applied to a tire.

Like reference characters indicate like parts throughout the views.

In the drawings 1 represents the clencher wheel rim, 3, 3 the retaining rings engaged thereby, 4 the tire seat, and 5 the tire of an ordinary wheel in conjunction with which parts my invention is herein illustrated. It will be understood, however, that my casing may be applied to tires or to tire mountings otherwise constructed.

My casing consists of a metallic network or mesh comprising interengaging clenching members and rings. Its detailed construction is as follows. From a sheet of steel or similar metal is cut a plurality of quadrilateral or lozenge shaped blanks or planchets 7 provided with lateral recesses 8 in each side, forming at the corners of the blank four radially disposed pointed arms 9 as shown in Fig. 1. Each blank 7 is next cupped up with the arms 9 extending vertically from the rounded body portion, as shown in Fig. 2, whereby are formed by virtue of the recessed portions circumferential openings at opposite points in the same horizontal plane in the cup wall.

19 are steel plates, each of which is substantially octagonal in outline and provided with four oblong marginal slots 20 parallel with alternate edges of the blank. Through each slot 20 passes one of the arms 9 of each of four clenching members. The arms 9 are then bent inwardly with their pointed ends converging and in contact with each other over the portions of the plate between the slots and the marginal edges, it being noted that said portions are loose in the openings 8, thus forming a substantially spherical clenching member, as shown in Fig. 6. The portion of the ball at and adjacent the points of convergence of the arms is slightly flattened. Each plate 19 engages four of the clenching members, as shown in Fig. 6, and in respect to their longitudinal rows the clenching members are in staggered relation to each other thus minimizing any tendency of the guard to slip in any direction upon the road surface. The members 7 gradually decrease in diameter from the tread or central portion of the casing to its margins, thus distributing the metal most advantageously for wear. The plates 19 also gradually decrease in diameter from the tread to the marginal portions. The decreasing dimensions of the plates results in making the casing prefectly conform transversely as well as longitudinally to the contour of the inclosed tire. The diminishing size of the clenching members also facilitates the use of the smaller plates. Attaching hooks 12 are connected with the marginal plates 19.

Fig. 7 shows a modified form of casing, part of the plates and clenching members being somewhat different, but to which no claim is made herein.

What I claim is,

1. A tire casing comprising a plurality of interengaging clenching members and connecting members, the connecting members comprising plates provided with marginal slots and the clenching members being substantially spherical in form and provided with foldable portions adapted to pass through said slots and engage the plates, said foldable portions being diametrically disposed in pairs and foldable with their ends abutting.

2. A tire casing comprising a network of clenching members substantially spherical in form and connecting members, the connecting members comprising plates, each provided with four marginal slots substantially equidistant from each other and disposed upon four sides of the plate, and each clenching member comprising foldable portions adapted to pass through said slots.

3. A tire casing comprising a network of clenching members substantially spherical in form, and connecting members, said connecting members comprising octagonal plates provided with marginal slots substantially equidistant from each other and disposed upon diametrically opposite sides of the plates, and each clenching member having bendable portions adapted to pass through said slots.

In testimony whereof I have affixed my signature in presence of two witnesses.

HARRY R. HOLBROOK.

Witnesses:
    LEONARD W. HORTON,
    HORATIO E. BELLOWS.